Nov. 19, 1957 A. C. FIELDS 2,813,595
ELECTROSTATIC PRECIPITATORS
Filed Nov. 2, 1954 3 Sheets-Sheet 2
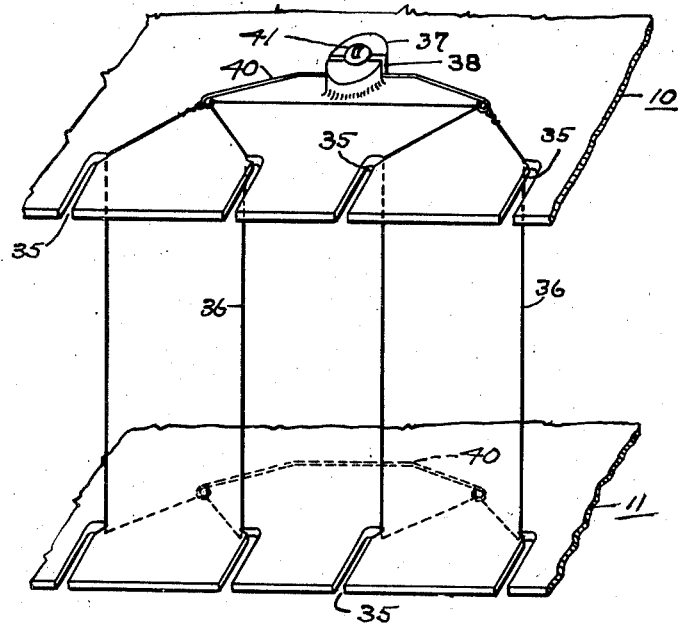
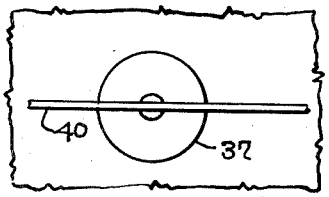
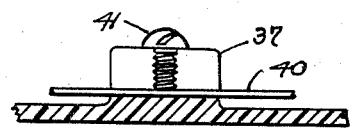
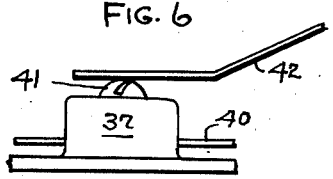
INVENTOR.
ARNOLD C. FIELDS
BY
Robert J. Palmer
Attorney

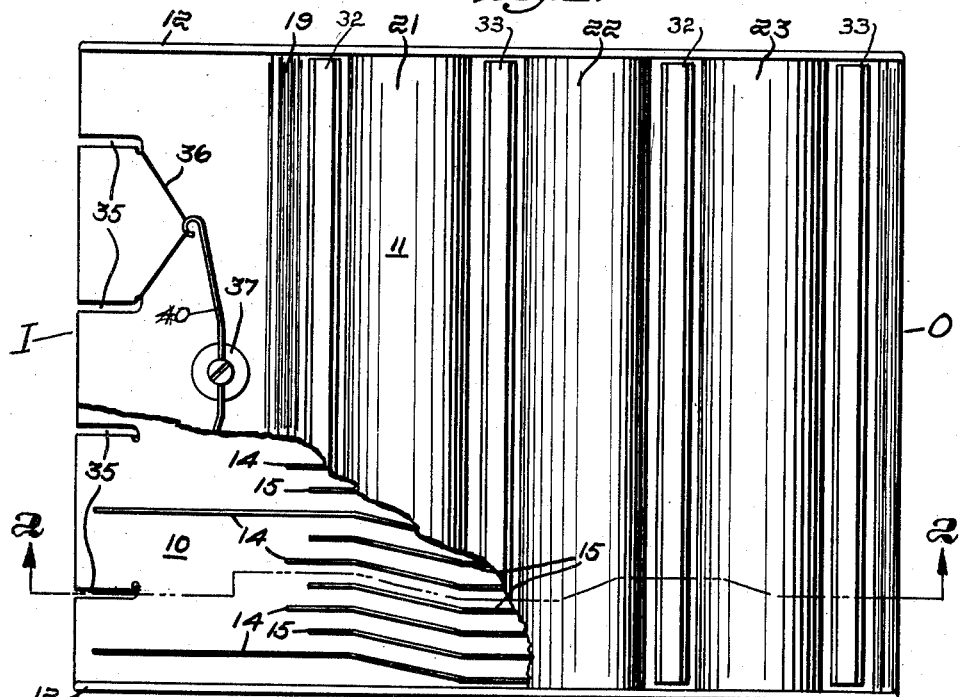
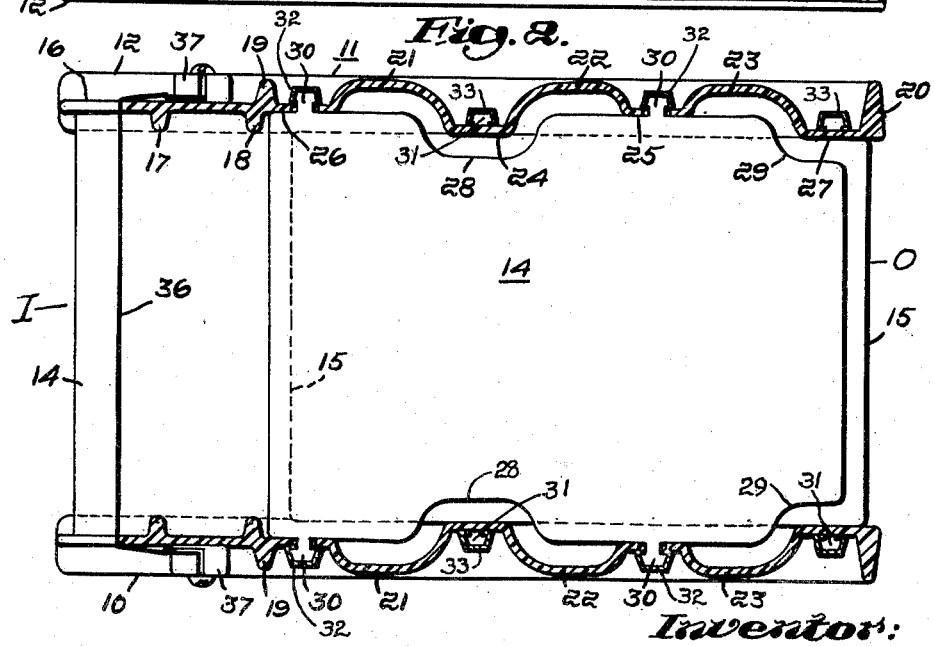

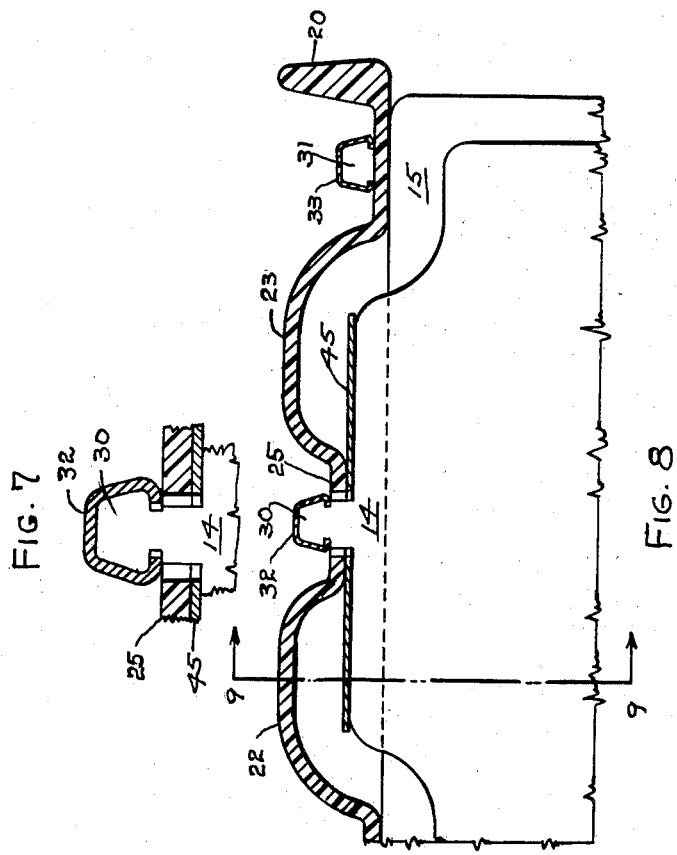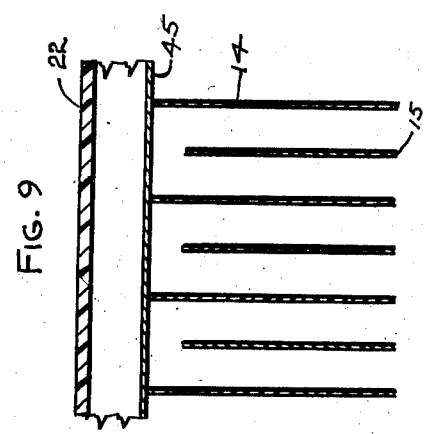

United States Patent Office 2,813,595
Patented Nov. 19, 1957

2,813,595
ELECTROSTATIC PRECIPITATORS
Arnold C. Fields, Medfield, Mass., assignor to Westinghouse Electric Corporation, East Pittsburgh, Pa., a corporation of Pennsylvania Application November 2, 1954, Serial No. 466,398

4 Claims. (Cl. 183—7)

This invention relates to electrostatic precipitators for removing small foreign particles such as dust, from gases such as air.

Electrostatic precipitators used for cleaning air for ventilation usually have metal casings, and have ionizer wires and collector plates charged to high voltages, requiring such wires and plates to be insulated from the casings. The collector plates usually are supported by slotted bars or by tie rods and spacers.

This invention eliminates the need for the usual metal casings, insulators and collector plate supports. Two oppositely positioned side walls of electrical insulating material are used to support directly the ionizer wires and collector plates, the end grounded collector plates forming the end walls of the precipitator.

A feature of this invention is that the charged and grounded collector plates are provided with tabs which extend through the side walls of insulation, the tabs on the charged plates being aligned and spaced longitudinally of the plates from the aligned tabs on the grounded plates. The tabs on the charged plates are connected together at the outer surfaces of the insulating side plates as are the tabs on the grounded plates.

Another feature of this invention is that the upper portions of the insulating side walls are provided with longitudinally extending slits, and an ionizer wire is interlaced through the slits to provide several ionizer wire passes.

Still another feature of this invention is that the insulating side walls are formed with undulations for providing maximum lengths of surface creepage paths, and for providing baffling by contacting the edges of all of the collector plates.

An object of this invention is to reduce the manufacturing cost of electrostatic precipitators.

This invention will now be described with reference to the annexed drawings, of which:

Fig. 1 is a side elevation, with a portion of one of the sides removed, of an electrostatic precipitator embodying this invention;

Fig. 2 is a section along the line 2—2 of Fig. 1;

Fig. 3 is a projected view of the ionizer portion of the precipitator of Figs. 1 and 2;

Fig. 4 is an enlarged plan view looking downwardly upon a slotted boss formed on one of the insulating side plates with a portion of an ionizer wire supporting spring rod in the slot;

Fig. 5 is a cross section of Fig. 4 with rod clamping screw added;

Fig. 6 is a side view showing a brush for applying high voltage to the ionizer wire by contacting the screw which holds the ionizer wire supporting rod in the slotted boss;

Fig. 7 is an enlarged view in section showing one of the tab supporting channels around a tab on a collector plate;

Fig. 8 is an enlarged fractional view of one side of the precipitator, showing a modification in which a metal plate is placed between the grounded collector plates and the adjacent insulating side wall, and Fig. 9 is a section along the line 9—9 of Fig. 8.

The precipitator illustrated by the drawings has a gas inlet I and a gas outlet O between which a gas passage is formed by the oppositely positioned side walls 10 and 11 of electrical insulating material, and the end grounded collector plates 14. The walls 10 and 11 are preferably moulded from a suitable plastic having good electrical insulation, such, for example, as methyl methacrylate or triallylcyanurate copolymer. Each side wall has end walls 12 which extend parallel to the upstream ends of the grounded collector plates 14 and of the charged collector plates 15, and has a wall 16 extending between such end walls, which wall 16 has ribs 17 and 18 extending inwardly from its upstream portion; has a rib 19 extending outwardly downstream of the rib 18, and has an outwardly extending rib 20 at its downstream end. Between its ribs 19 and 20 each wall 16 is formed in outwardly extending domes 21, 22 and 23, each of the domes 21 and 22 being separated by a flattened wall portion 24, and each of the domes 22 and 23 being separated by a flattened wall portion 25. A flattened wall portion 26 separates each of the ribs 18 and domes 21, and a flattened wall portion 27 separates each rib 20 and dome 23.

The respective flattened wall portions 25 and 26 extend in longitudinal alignment, and extend outwardly of the longitudinally aligned, respective flattened wall portions 24 and 27. The grounded collector plates 14 have edges which contact the flattened wall portions 25 and 26, and which are cut away at 28 and 29 to clear the side wall portions 24 and 27 respectively. The charged collector plates 15 are narrower than the grounded collector plates 14, and have edges which contact the flattened wall portions 24 and 27.

The flattened wall portions 25 and 26 have slits through which extend the tabs 30 on the grounded collector plates 14. The flattened wall portions 24 and 27 have slits through which extend the tabs 31 on the charged collector plates 15. As shown most clearly by Figs. 7 and 8, the tabs 30 and 31 have recessed inner portons into which the inturned ends of the metal channels 32 and 33 respectively, extend, the channels being shaped to fit the tabs and being slidably positioned thereon. The channels serve to clamp the collector plates to the insulating side walls, and to electrically connect their associated collector plates.

The upstream ends of the side walls 10 and 11 have longitudinally extending slits 35 in the inner ends of which are interlaced an ionizer wire 36, forming four ionizer wire passes. Each insulating wall 16 has a boss formed on its outer surface adjacent its upstream end, and which contains a slot 38 in which a small rod 40 of spring metal is held by a screw 41. The rods 40 have bent over ends forming loops through which the passes of the wire 36 extend, the ends of the wire being secured to the ends of one of the rods 40. A spring arm 42 is provided for contacting one of the screws 41 as shown by Fig. 6, and would be connected to a positive high voltage terminal of an associated power pack which is not illustrated, for charging the wire. The high voltage terminal would also be connected to one of the channels 33 for charging its associated collector plates 15. The negative, grounded terminal would be connected to one of the channels 32 of the grounded collector plates 14.

The upstream portions of the end collector plates 14 and of every fourth intermediate plate 14 extend upstream past the ionizer wire, and form non-discharging ionizer electrodes on opposite sides of the wire passes, In operation, the electrostatic field between the ionizer wire passes and the extended portions of the grounded collector plates would electrostatically charge the dust particles in the gas being handled, causing the dust to be precipitated on the grounded plates downstream of the ionizer section. A fan which is not illustrated, would be connected to the inlet I or the outlet O for moving the gas through the unit.

The domes 21, 22 and 23 provide elongated insulator surface for decreasing electrical leakage. The flattened wall portions 24, 25, 26 and 27 by contacting the edges of the collector plates, form baffles which prevent any by-pass of gas to be cleaned.

By using the side walls 10 and 11 of insulation, the conventional insulators for the ionizer wire and the charged collector plates are dispensed with. By providing the plates with tabs which extend through the side plates, the usual tie rods and spacers are dispensed with. The resulting precipitator is lighter and less expensive than prior ones used for the same duty.

In the operation of a precipitator similar to that shown by Figs. 1 and 2, it was found that due to the presence of electrostatic charges on the insulating side walls, there was a tendency for dust to deposit thereon and form high resistance leakage paths. For preventing this, the precipitator was modified as shown by Figs. 7, 8 and 9 by placing the metal plates 45 between the edges of the grounded plates 14 and the adjacent side wall portions. These plates 45 collect the dust which otherwise would tend to deposit on the side walls.

While one embodiment of this invention has been described for the purpose of illustration, it should be understood that the invention is not limited to the exact apparatus and arrangement of apparatus illustrated, since modifications thereof may be suggested by those skilled in the art, without departure from the essence of the invention.

What is claimed is:

1. An electrostatic precipitator comprising a pair of oppositely positioned side walls of electrical insulation, collector plates extending between said walls, said plates having tabs extending through said walls, the tabs on alternate of said plates being in alignment, the tabs on the others of said plates being in alignment and spaced longitudinally along said walls from said tabs on said alternate plates, means connecting said tabs on said alternate plates, and means connecting said tabs on said other plates, said alternate plates being wider than said other plates, said walls having portions which contact portions of the longitudinal edges of said other plates adjacent said tabs on said other plates, said alternate plates having cut-outs into which said wall portions extend.

2. An electrostatic precipitator as claimed in claim 1 in which said walls have portions which contact the longitudinal edges of said alternate plates adjacent the tabs on said alternate plates, and in which said walls are curved outwardly between where said wall portions contact said edges of said other and alternate plates.

3. An electrostatic precipitator as claimed in claim 2 in which said walls at one end thereof have longitudinally extending slits, in which an ionizer wire is interlaced in said slits to form a plurality of wire passes, in which slotted bosses are formed on the outer surfaces of said walls at said wall ends downstream of said slits, and in which ionizer wire supporting arms of spring metal are held in said slotted bosses, said arms having turned over ends through which said wire passes extend.

4. An electrostatic precipitator as claimed in claim 1 in which metal plates extend between said side walls and the edges of a plurality of said collector plates for preventing dust from depositing upon said walls adjacent said edges.

References Cited in the file of this patent
UNITED STATES PATENTS

| 1,357,466 | Moller | Nov. 2, 1920 |
| 1,992,974 | Thomson | Mar. 5, 1935 |
| 2,327,588 | Bennett | Aug. 24, 1943 |
| 2,696,893 | Richardson | Dec. 14, 1954 |

FOREIGN PATENTS

| 891,500 | Germany | Sept. 28, 1953 |